United States Patent
Rysti

[11] 3,923,142
[45] Dec. 2, 1975

[54] METHOD AND APPARATUS FOR DOSAGE OF SAWN TIMBER

[76] Inventor: Alpo Rysti, Frisansintie 22, 02240 Frisans, Finland

[22] Filed: May 29, 1974

[21] Appl. No.: 474,248

[30] Foreign Application Priority Data
June 6, 1973 Finland.............................. 1838/73

[52] U.S. Cl. ..................... 198/25; 198/34; 198/167
[51] Int. Cl.² ......................................... B65G 47/00
[58] Field of Search ........... 198/34, 25, 20, 21, 167, 198/160, 162; 214/1 B

[56] References Cited
UNITED STATES PATENTS

| | | | |
|---|---|---|---|
| 1,887,211 | 11/1932 | Mortimer.............................. | 198/25 |
| 2,423,441 | 7/1947 | Dennie............................. | 198/34 X |
| 2,922,445 | 1/1960 | Osmond et al.................... | 198/25 X |
| 3,081,863 | 3/1963 | Monohan............................. | 198/34 |
| 3,608,695 | 9/1971 | Hellstrom ............................. | 198/34 |
| 3,717,236 | 2/1973 | New..................................... | 198/34 |

*Primary Examiner*—Evon C. Blunk
*Assistant Examiner*—James M. Slattery
*Attorney, Agent, or Firm*—V. Alexander Scher

[57] ABSTRACT

A method for dosing, one by one, pieces of sawn timber arriving in a transversal position on a feed conveyor so that they are consecutively delivered at fixed intervals onto a second conveyor, the method comprising the use of supporting arms moved synchronously with the second conveyor along a closed path between the feed and second conveyors. The method is particularly characterized in that pressing pieces separate from the supporting arms are employed, these pressing pieces moving synchronously with the supporting arms between the feed and second conveyors along a closed path and being guided to adhere to this path; said pressing pieces further being released or positively guided to descend on the piece of timber arriving at the dosage point, in a region having a breadth measured from the stop arresting said piece of timber which is smaller than the width of the narrowest piece of timber expected to be handled; and said pressing pieces clamping the pieces of sawn timber against the supporting arms for the duration of the dosage operation, thereby enabling dosage to be carried out even at high speeds.

6 Claims, 2 Drawing Figures

METHOD AND APPARATUS FOR DOSAGE OF SAWN TIMBER

The present invention concerns a dosage method for sawn timber, for the purpose of dosing pieces of sawn timber arriving in transversal direction on a feed conveyor, to be delivered at fixed intervals onto a continuation conveyor, such as a sorting conveyor, and in which method supporting arms are employed, which are moved at a speed synchronous with the continuation conveyor along a closed path between the feed conveyor and the continuation conveyor.

The invention furthermore concerns an apparatus for carrying out this dosage method.

The processing of sawn timber requires, in several work steps, that the package, or pile, of sawn timber is dispersed by various methods so that each board or deal can be subjected to individual handling. The work step in which this separation is accomplished is usually called the dosage operation, and this operation usually implies that of the sawn timber a mat is formed e.g., on a slightly inclined roller track of a feed conveyor, which has a stop at its end. The mat may also be formed on a level or ascending track, in which case the roller track is replaced by a conveyor or by a combination of conveyor and roller track. By the dosage method constituting the object of the invention, each board or deal by itself is taken from this sawn timber mat and delivered to a continuation conveyor, provided with dogs, which is a transversal conveyor. The dosage device is synchronized with the continuation conveyor so that it delivers one board or deal to lie in front of the dog of the continuation conveyor. In this manner the individual handling of each board or deal on or after the continuation conveyor is made possible.

A number of different dosage methods and devices are known in prior art. The major drawback of dosage devices available on the market at present is their slow operation, due to the fact that owing to their construction they cannot without disturbance of their function simultaneously handle sawn timber pieces of different width and thickness when dosage is practiced at high speed.

The present invention partly emerged from the sawn timber dosage methods and apparatus disclosed in the earlier Finnish Pat. applications No. 2697/72 and 69/73. The design solutions disclosed in said applications may, in applicable parts, be utilized in association with the present invention.

The object of the present invention is to present a dosage apparatus wherein the timber to be dosed is held in a more simple and positive manner during the dosage operation than before, thereby enabling the dosage apparatus to be used with higher speeds than before, particularly when sawn timber pieces having different width and thickness are simultaneously handled.

The method according to the invention is mainly characterized in that in the dosage method pressing means separate from the supporting arms and moving at a speed synchronous with the supporting arms between the feed conveyor and continuation conveyor along a closed path, and guided along this path, are used, which are released or guided to descend on the piece of timber arriving to the dosage process, in a region having a breadth measured from the stop which is less than the width of the narrowest piece of sawn timber arriving to be dosed, and that said pressing means fix the piece of sawn timber against the supporting arms for the duration of the dosage operation, thereby enabling the dosage also to be carried out at high speeds.

The apparatus according to the invention, again, is mainly characterized in that the dosage apparatus comprises a shaft driven at a speed synchronous with the supporting arms and with the continuation conveyor and to which shaft the pressing means, which possess a pressing force and are guided, have been affixed.

The invention is described in detail in the following with reference to one embodiment example of the invention, illustrated by the figures of the attached drawing, but to which the invention is in no way confined.

Figure 1:
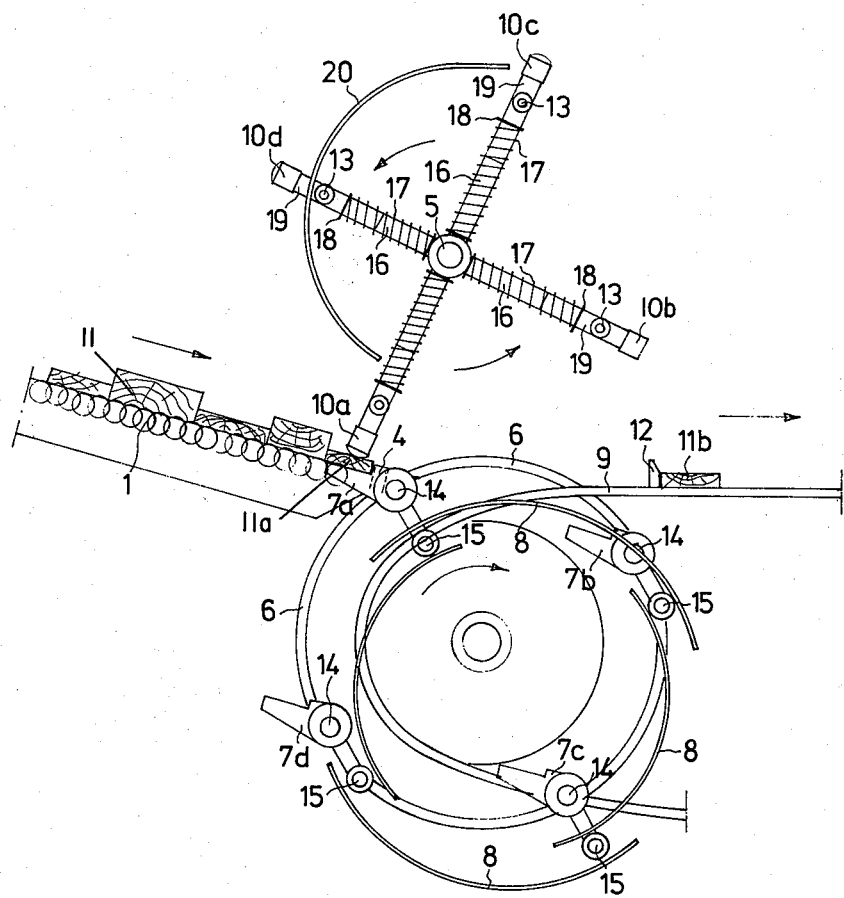
FIG. 1 shows the dosage apparatus in elevational view.
Figure 2:
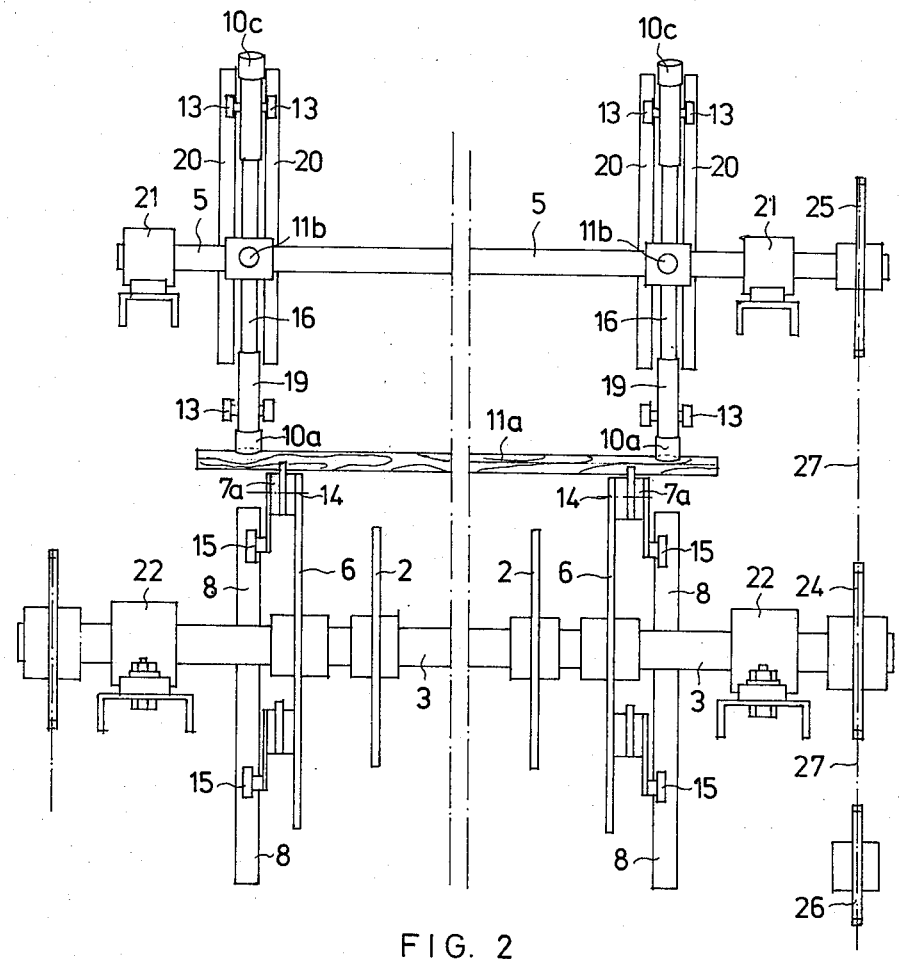
FIG. 2 shows the dosage apparatus of FIG. 1, seen from the side of the continuation conveyor.

As can be seen from the figures, the pieces of timber 11 to be fed into the dosage process flow by gravity action side against side along the roller track 1, which has at its end a stop 4, against which the piece of timber 11a arriving for dosage stops. The roller track 1 with its associated equipment constitutes the feed conveyor in this embodiment example. Adjacent to the end of the roller track 1 the actual dosage device has been mounted, consisting of a shaft 3 driven by means of sprocket wheels 24 and 26, the bearing of this shaft indicated with reference numeral 22. To the shaft 3 two radial flanges 6 or equivalent means have been attached, to both of which axle pins 14 have been fixed with uniform spacing, these axle pins in their turn carrying pivotally turnable supporting arms 7a to 7d (hereinafter designated as 7), on the support of which the dosage of the pieces of timber 11 takes place. On the shaft 3 furthermore the sprocket wheels 2 for the continuation conveyor have been mounted, the conveyor chains 9 of the continuation conveyor passing over these wheels, and which chains carry dogs 12 at a uniform spacing.

The supporting arms 7, of which four pairs have been depicted, are two-armed levers affixed to the flange 6 at the pivotal point 14. One lever arm of the supporting arms 7 carries out the transport of the pieces of sawn timber to be dosed, while the other lever arm is responsible for the guiding of the supporting arms 7 by the aid of the roll 15. The rolls 15 engage with curved deflectors 8, by the effect of which the supporting arms 7 are most appropriately guided so that the side of the supporting arms 7 meeting the piece of timber 11 when engaging the piece 11a on the feed conveyor 1,4 is substantially parallel to the lower surface of this piece 11a, and so that the supporting arms 7 deposit the piece 11b in a position substantially parallel with the band 9 of the continuation conveyor in front of the dog 12, as has been disclosed in the Finnish Pat. application No. 2697/72.

According to the invention, the holding, or clamping, of the sawn timber pieces 11 in contiguity with the supporting arms 7 during the dosing operation is accomplished by means of a special device placed above the feed and continuation conveyors. This device comprises a shaft 5 driven by means of a chain 27 and sprocket wheel 25 at a speed synchoronous with the continuation conveyor and the shaft 3. The bearings of the shaft 5 have been indicated with the reference numeral 21. To the shaft 5 four radial pairs of arms 16 have been fixed crosswise, which arms have most appropriately been made of tubular material. Upon the arms 16 at their outer ends sleeves 19 have been mounted, which have pressing pieces 10a to 10d (hereinafter designated as 10) at their ends. The sleeves 19 have flanges 18, against which the end of a helical spring 17 abuts. Furthermore, on the sleeve 19 guiding rolls 13 have been turnably carried, which engage with the curved deflector 20 in a certain sector of rotation of the shaft 5.

The operation of the apparatus just presented is now described. On the feed conveyor, the pieces of sawn timber 11 arrive in the form of a mat, and the foremost piece 11 a stops against the stop 4. The width and thickness of the pieces 11 may vary within wide limits. For this reason the side of the supporting arms 7 meeting the lower side of the timber piece 11 has been dimensioned to have, at most, a length equal to the length occupied by the narrowest piece 11. As the supporting arm 7a comes into contact with the piece 11a from below (FIG. 1), the pressing means 10a simultaneously meets the same piece 11a from above after the guiding roll 13 has been released by the deflector 20, whereby the pressing means 10a is pushed by the spring 17 against the top surface of the piece 11a. Hereby the piece 11a (or in the case of a piece with greater width, its front edge) is firmly clamped between the supporting arm 7a and the pressing means 10a through the duration of the dosage operation, or substantially up to the time when the piece 11a meets the bands 9 of the continuation conveyor and the supporting arms 7 and pressing means 10 release their grip of the piece 11. The deflector 20 and the guiding rolls 13 have been arranged so that also the thickest pieces 11 will be admitted under the pressing means 10.

The number of supporting arms 7 and pressing means provided for one piece of sawn timber 11 may be more than two, depending on the length of the pieces 11. The number of groups of supporting arms 7a, 7b, 7c, 7d as well as pressing means groups 10a, 10b, 10c, 10d may also be a number other than four.

I claim:
1. Method for dosage of sawn, oblong pieces of timber from a feed conveyor onto a continuation conveyor to follow each other at fixed intervals, comprising feeding the timber pieces to be dosed in a direction transverse to their longitudinal direction, the timber pieces lying one after the other as a continuous mat; moving supporting arms along a closed path between the feed and continuation conveyors at a speed synchronous with the continuation conveyors; moving pressing members between the feed and continuation conveyors at a speed synchronous with the continuation conveyor, on the side of said arms which is opposite to the timber mat; guiding said supporting arms on their closed path to support the piece of timber which is first in said timber mat in its feed direction, from the underside of this piece; guiding said pressing members on their closed path to position themselves above the timber pieces resting on said supporting arms; releasing said pressing members to press down from above on the upper surface of the timber pieces resting on the supporting arms in such an area in the width direction of the timber piece that the point of action of the pressing members is located, counted from the front edge of the timber piece, within a distance equalling the width of the narrowest timber piece to be handled; and transporting the timber piece, clamped between said supporting arms and pressing members, onto the continuation conveyor to be transported further.

2. Device for the dosage of sawn, oblong pieces of timber, comprising a feed conveyor carrying the mat of timber pieces to be dosed; a stop device at the ultimate end of said feed conveyor for stopping overfeed of the timber mat; an intermediate conveyor located close to the feed conveyor, and comprising a rotatable shaft, flange-like members attached to said shaft, supporting arms pivotally carried on said members, and curved guides, acting upon the supporting arms, and guiding their position in their pivotal attachment; a pressing device, located above the juncture of the feed conveyor and the intermediate conveyor; and comprising a rotatable shaft, arm-like pressing members affixed transversally thereto, spring means connected with said pressing members, a curved guide, stop members adapted to engage said guide, said pressing members being triggered to be released to come down on the timber piece to be dosed, in association with the end of said curved guide; a continuation conveyor on the opposite side of the intermediate conveyor with reference to the feed conveyor, comprising conveyor belts, and holders on said conveyor belts; and means for driving with mutually synchronous speeds the continuation conveyor and the pressing device.

3. Dosage apparatus according to claim 2, characterized in that in the pressing device to the shaft (5) radial arms (16) have been fixed, upon their outer ends a sleeve (19) being provided, which has a spring-loaded (17) pressing means (10) at its outer end.

4. Dosage apparatus according to claim 3, characterized in that a helical spring (17) disposed around the arm (16) acts against a flange (18) affixed to the sleeve (19).

5. Dosage apparatus according to claim 4, characterized in that in association with the pressing device (10) guiding rolls (13) have been provided, which in a given sector of rotation of the shaft (5) engage with a curved deflector (20 so that when the dosage operation begins the spring pressing means (10a) is released against the upper side of the thickest and also of the thinnest piece of sawn timber (11a) in a region having a breadth measured from the stop (4) which at most equals the width of the narrowest piece of sawn timber (11) to be dosed.

6. Dosage apparatus according to claim 5, characterized in that the deflector (20) has been placed at such height that the thickest sawn timber pieces (11) are also admitted under the pressing means (10).

* * * * *